(12) United States Patent
Lefor et al.

(10) Patent No.: US 9,009,620 B2
(45) Date of Patent: Apr. 14, 2015

(54) INTERACTIVE SCROLLBARS FOR UNKNOWN DATA SIZE

(75) Inventors: Todd Lefor, Fargo, ND (US); Adrian Orth, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 13/178,454

(22) Filed: Jul. 7, 2011

(65) Prior Publication Data
US 2013/0014051 A1 Jan. 10, 2013

(51) Int. Cl.
*G06F 3/048* (2013.01)
*G06F 3/0485* (2013.01)

(52) U.S. Cl.
CPC .................... *G06F 3/0485* (2013.01)

(58) Field of Classification Search
CPC ........................ G06F 3/0485; G06F 3/04855
USPC ............................ 715/784–789, 830; 345/684
See application file for complete search history.

(56) References Cited

U.S. PATENT DOCUMENTS

| | | | | |
|---|---|---|---|---|
| 4,831,556 | A * | 5/1989 | Oono | 715/786 |
| 6,204,846 | B1 * | 3/2001 | Little et al. | 715/784 |
| 6,339,437 | B1 * | 1/2002 | Nielsen | 715/787 |
| 7,334,185 | B2 * | 2/2008 | Wicks | 715/204 |
| 7,667,719 | B2 | 2/2010 | Goodwin et al. | |
| 7,676,759 | B2 * | 3/2010 | Carter | 715/783 |
| 7,996,786 | B2 * | 8/2011 | MacLaurin et al. | 715/788 |
| 2002/0080195 | A1 | 6/2002 | Carlson et al. | |
| 2004/0119753 | A1 * | 6/2004 | Zencke | 345/786 |
| 2004/0150630 | A1 * | 8/2004 | Hinckley et al. | 345/173 |
| 2006/0038783 | A1 * | 2/2006 | Shaw et al. | 345/163 |
| 2006/0174212 | A1 | 8/2006 | Cok | |
| 2006/0200764 | A1 | 9/2006 | Sellers et al. | |
| 2007/0157112 | A1 * | 7/2007 | Peters | 715/786 |
| 2007/0186182 | A1 * | 8/2007 | Schiller | 715/781 |
| 2008/0082939 | A1 | 4/2008 | Nash et al. | |
| 2009/0044142 | A1 | 2/2009 | Faris et al. | |
| 2009/0070707 | A1 * | 3/2009 | Schaller et al. | 715/787 |
| 2010/0180186 | A1 * | 7/2010 | Skinner et al. | 715/205 |
| 2010/0214249 | A1 | 8/2010 | Ikeda et al. | |
| 2011/0113365 | A1 * | 5/2011 | Kimmerly et al. | 715/806 |
| 2011/0202871 | A1 * | 8/2011 | Bair et al. | 715/786 |
| 2011/0258576 | A1 * | 10/2011 | Bos et al. | 715/786 |
| 2012/0036428 | A1 * | 2/2012 | Tsuda et al. | 715/252 |
| 2013/0254707 | A1 * | 9/2013 | Lambourne et al. | 715/787 |

OTHER PUBLICATIONS

"Continuous Scrolling," 2008, ui-patterns.com, pp. 1-10.*
Kumar, et al., "Gaze-enhanced Scrolling Techniques", Retrieved at <<http://hci.stanford.edu/publications/2007/WIP265-kumar.pdf, May 3, 2007, pp. 6.

* cited by examiner

*Primary Examiner* — Kieu Vu
*Assistant Examiner* — Asteway T Gattew
(74) *Attorney, Agent, or Firm* — Damon Rieth; Jim Ross; Micky Minhas

(57) ABSTRACT

Scrollbar control is utilized for manually scanning for displayed/available information while controlling the amount of information that is actually materialized. In response to a drag and hold of the "thumb" to a beginning or end location of the scrollbar, additional records may be retrieved depending on a display order of data on the user interface. If the location corresponds to an end of records (whether at the beginning or at the end of the order), that may be indicated. Upon release, the thumb may be moved automatically to a predefined location to indicate additional available records at the source if that is the case.

19 Claims, 9 Drawing Sheets

INTERACTIVE SCROLLBARS FOR UNKNOWN DATA SIZE

BACKGROUND

A variety of applications present data that exceeds an available display area of the application user interface. One approach to handle this is the scrollbar utilized commonly by different kinds of user interfaces. For example, pages of data that can be viewed by scrolling up or down using various controls such as a keyboard, a mouse, and the like with the scrollbar providing a feedback regarding where in the overall amount of data the user is. The viewable data may include text, graphics, combination of the two, etc.

In a networked environment, an application may attempt to download the entire amount of data to present to a user before presenting it in its user interface. This approach may be infeasible by causing unacceptable delays in presentation of data to the user if the data is large, available bandwidth is small, or other system resources cause limitation in the downloading of the data from a server. Another alternative approach is downloading the data in groups and updating the user interface as data is downloaded. However, this approach may also result in "clunkiness" in the system, where the presented data may show up in pieces, delays may annoy the user, and the system resources may be unnecessarily occupied with downloading the whole data when the user may be interested only in a particular piece of it. Another challenge with conventional systems is the fact that typical scrolling attempts to "seek to" a specific record based on a percentage operation, which can be a system stressing operation.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users through the use of the scrollbar control to manually scan for the information they are looking for while controlling the amount of information that is actually materialized. In response to a drag and hold of the "thumb" to a beginning or end location of the scrollbar, additional records may be retrieved depending on a display order of data on the user interface. If the location corresponds to an end of records (whether at the beginning or at the end of the order), that may be indicated. Upon release of the thumb, it may be moved automatically to a predefined location to indicate additional available records at the source if that is the case.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
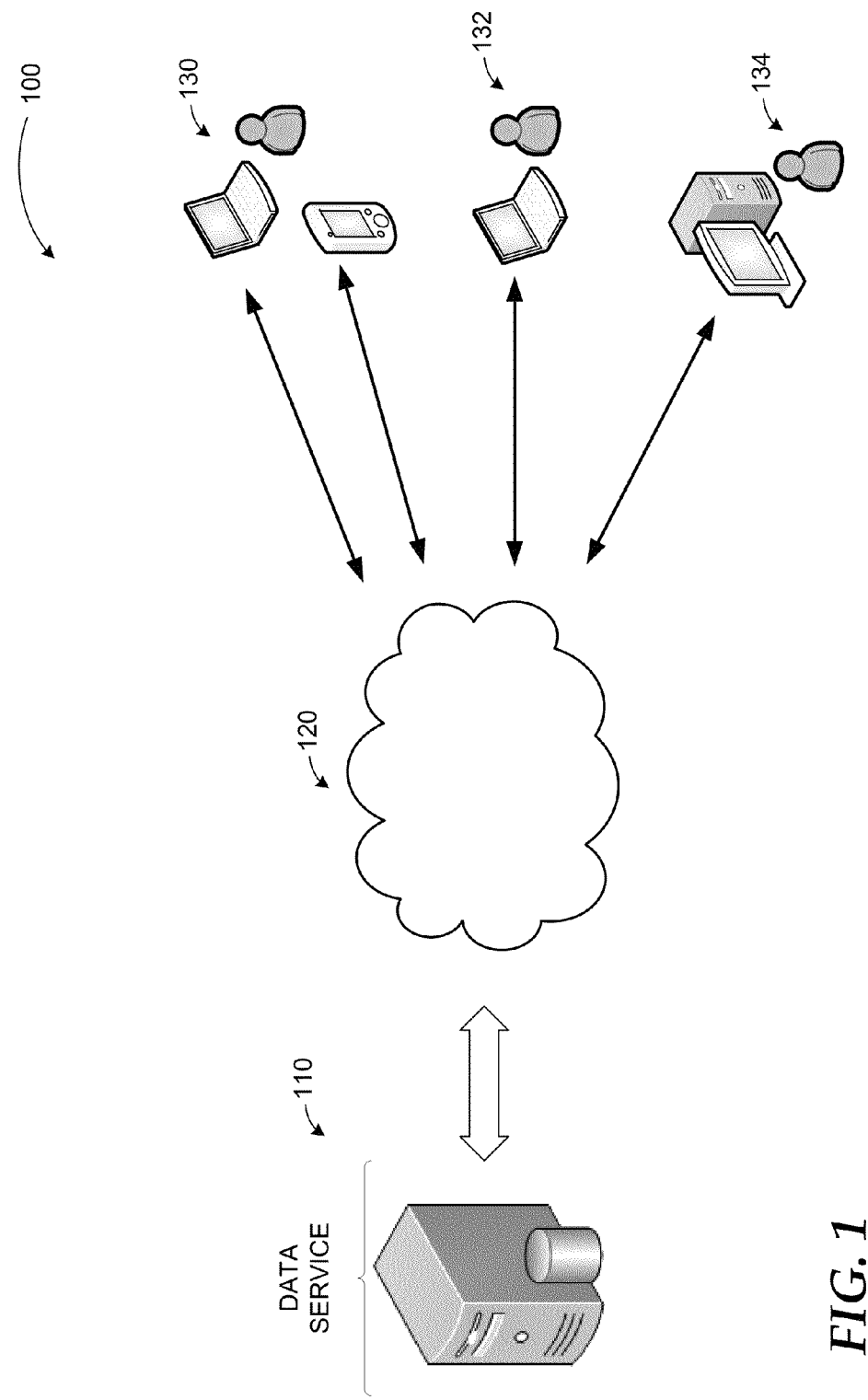
FIG. 1 is a diagram illustrating example components of a system employing modified scrollbar use for unknown data size in a client application.

As briefly described above, additional records may be retrieved depending on a display order of data on the user interface in response to a drag and hold of the "thumb" to a beginning or end location of the scrollbar. If the location corresponds to an end of records, that may be indicated. Upon release of the thumb, it may be moved automatically to a predefined location to indicate additional available records at the source if that is the case. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer readable memory device. The computer-readable storage medium can for example be implemented via one or more of a volatile computer memory, a non-volatile memory, a hard drive, a flash drive, a floppy disk, or a compact disk, and comparable physical storage media.

Throughout this specification, the term "platform" may be a combination of software and hardware components for presenting data through client applications. Examples of platforms include, but are not limited to, a hosted service executed over a plurality of servers, an application executed on a single server, and comparable systems that may provide various forms of data such as search results. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A "thumb" is a user interface control component used to browse through displayed information on a client application user interface. A scrollbar containing a thumb may be located on the right hand side or the left side of the application user interface and moved up or down to scroll up or down the displayed information. The thumb may be moved by clicking and holding the thumb while moving up or down. Alternatively, the thumb may be moved downward using a down button located at the bottom of the scroll or upward using an up button located at the top of the thumb scroll.

In a typical implementation, the scrollbar is used to search through a set of information using a "percentage" metaphor. Dragging the thumb on the scrollbar to a 75% position, for example, returns the information located at 75% within the set. This presents a scalability and accuracy challenge for large data sets. That is, in order to return the 75% record, the total number of records needs to be known. When data is stored in a database or similar repository, this means that for each conditional collection of information, the data retrieval engine needs to materialize the entire set of information and count the number of items. This is specifically true when the dataset is based on specification or "subset" criteria described in database terms as restrictions or clauses. The subset restriction presents a challenge because unless all records are materialized, the database system may not "know" how many records are in the set. The process, in turn, requires additional network traffic and computational resource stress, potentially reducing scalability and limiting performance.

Embodiments are not limited to a thumb use as described above, however. For example, the scrollbar may be located anywhere on the client application user interface or may be detached from the user interface. The scrollbar may be horizontal having a right and left moving thumb. Alternatively, the thumb scroll may be represented as a wheel, a three dimensional object, etc., simulating motion to browse through displayed information.

Embodiments enable seamless data retrieval using a thumb location on a scrollbar to retrieve data on demand. On demand data retrieval may minimize resource utilization such as processing, memory, data storage, and network. Burden on a client application to provide entire contents of a data store is minimized by rapid data retrieval using the thumb scroll. While references are made to one dimensional scrollbars throughout the Specification and Claims, embodiments are not limited to a particular scrollbar configuration. Any scrollbar and thumb may be used applying the principles discussed herein.

FIG. 1 is a diagram illustrating example components of a system employing modified scrollbar use for unknown data size. In diagram 100, the server 110 may host a data service such as a data store providing information services to clients. The service may receive data requests such as a page of records, search results, and so on. Conventional scrollbar use facilitates browsing through entire data structures retrieved from data stores and loaded to client application memory. As discussed above, to present accurate information, conventional system's retrieval and use of entire data structures may tax client, server, and network resources.

Embodiments enable on demand retrieval and display of data through user interface controls such as scrollbar and thumb. The network 120 may be a local network or may be an external entity such as an Internet based infrastructure. It may provide wired or wireless connectivity. Clients 130, 132, 134, and the service may connect to each other through unsecured or secured connectivity. An example of a secured connectivity may be a Virtual Private Network (VPN) established among the clients and the data service with the use of encrypted communications.

The server 110 may store records in a data store provided to a client application upon a request. A user interaction with a client application may cause the client application to retrieve an initial set of records such as search results from the data store to display to the user. The client application may display the initial set of records according to the settings of the client application user interface (e.g., an order of records). Subsequent sets of records may be retrieved based on thumb location (e.g., user dragging and holding the thumb at 0% or 100% location) enabling the scrollbar to reflect size of data while minimizing resource consumption in data retrieval.

In an alternative embodiment, the server 110 may provide a data service using a database. In other embodiments, the data store may be a file or multiple files. The files may store data in a standard format such as extensible markup language (XML) file format. Alternatively, the data service may be provided by the client application or may be hosted in the same device hosting the client application. Embodiments are not limited to client/server and peer-to-peer architectures. Employing modified scrollbar use for unknown data size in client applications may be accomplished using other architectures.

Figure 2:
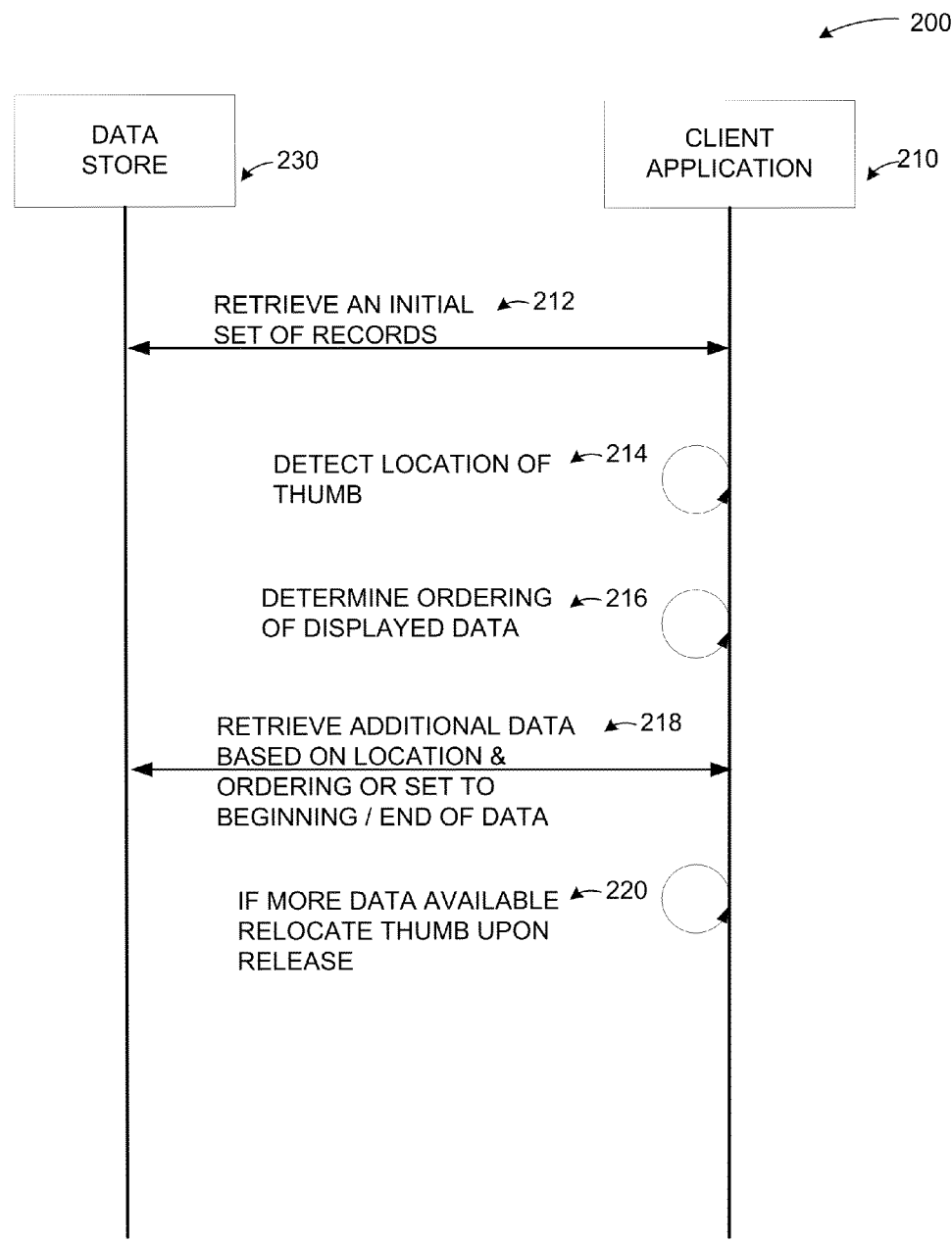
FIG. 2 illustrates an example action diagram of employing modified scrollbar use for unknown data size according to some embodiments.

FIG. 2 illustrates an example action diagram of employing modified scrollbar use for unknown data size. A client application 210 may display records retrieved from a data store 230. The client application may display the records on a user interface of the client application 210. The records may be units of data structures stored in the data store. An example record may be a database row. The records may be stored in a sorted data structure. An example of sorting may be character based sort such as A to Z or Z-A. An alternative example may be numerical sorting based on lowest to highest value or highest to lowest value. Additionally, the data store may use combinations of sorting algorithms such as an alpha-numeric sort algorithm. Provided sorting schemes are example illustrations and are not limiting on the data store or the client application.

A user may initiate operations in diagram 200 by engaging the client application 210. Upon user engagement, the client application may retrieve an initial set of records 212 from the data store 230. The client application may display the initial set of records according to the predefined order (e.g., alphabetic, numeric, etc.). In displaying the records, the client application may determine the height of the thumb and its location within the scrollbar according to a size the records.

Next, the client application may detect a location of the thumb 214. For example, the user may drag the thumb to a beginning position of the scrollbar (0% position) or an end position (100% position). Additionally, the user may hold the thumb at the dragged location. Because the display order of data governs a next action according to some embodiments, the application may determine the order of the displayed records 216 as the next operation.

Next, additional records may be retrieved or an indication of record end/beginning provided to the user depending on the thumb location/user action combination. For example, a thumb drag to 0% may result in a "beginning of record set", when the initial page load was oriented from the beginning of the record set (e.g., A-Z) ordering. Otherwise, it may result in a "page ahead read of records" in the reverse ordering. A thumb drag to 100% may result in a "end of records set" when the initial page load was oriented from the end of the records set (e.g., Z-A) ordering. Otherwise, the application may provide a "page ahead read of records" in the reverse ordering. In other examples, the initial page may be in the middle (or in an arbitrary place) of the results such that both forward and reverse are unknown.

In another example, a thumb drag and hold to 0% may result in a "beginning of record set" when the initial page load was oriented from the beginning of the record set (e.g., A-Z) ordering. Otherwise, it may result in a "continuous page ahead read of records" in the reverse ordering. A thumb drag and hold to 100% may result in a "end of records set" when the initial page load was oriented from the end of the records set (e.g., Z-A) ordering. Otherwise, the client application may provide a "continuous page ahead read of records" in the reverse ordering. Embodiments are not limited to client/server architecture. Some implementations may be in applications that include their own data seek/retrieval database code.

If still more data is available, the thumb may be relocated to a predefined location upon release. For example, when the thumb is released at the 0% position, and the complete record set has not been returned, the thumb may jump back to the 20% position to indicate "more records." Otherwise, the thumb may rest at the 0% position. When the thumb is released at the 100% position, and the complete record set has not been returned, the thumb may jump back to the 80% marker to indicate "more records." Otherwise, the thumb may rest at the 100% position. Embodiments are not limited to the specific positions discussed above. Other percent positions (e.g., 10%-90%, 15%-85%, etc.) may be used to indicate more records in either direction. Moreover, the resting positions may also be other than 0%-100% (e.g. 5%-95%, etc.). Indeed, some embodiments may include varying the retrieval speed based on the closeness to the absolute position. For example, the retrieval speed may be set to a higher value when the thumb is positioned at 0% compared to positioning the thumb at 5%.

Thus, the scrollbar thumb brought to the 100% (or 0% position depending upon current data ordering) acts as a continuous scan or "fast forward" or "fast reverse" control instead of seeking to the absolute 0% or 100% position (depending upon direction of scan) when the total number of data items is not known. This enables the user to control the number of records that are read into memory, reducing server and memory stress and resulting in an effective user experience.

Figure 3:
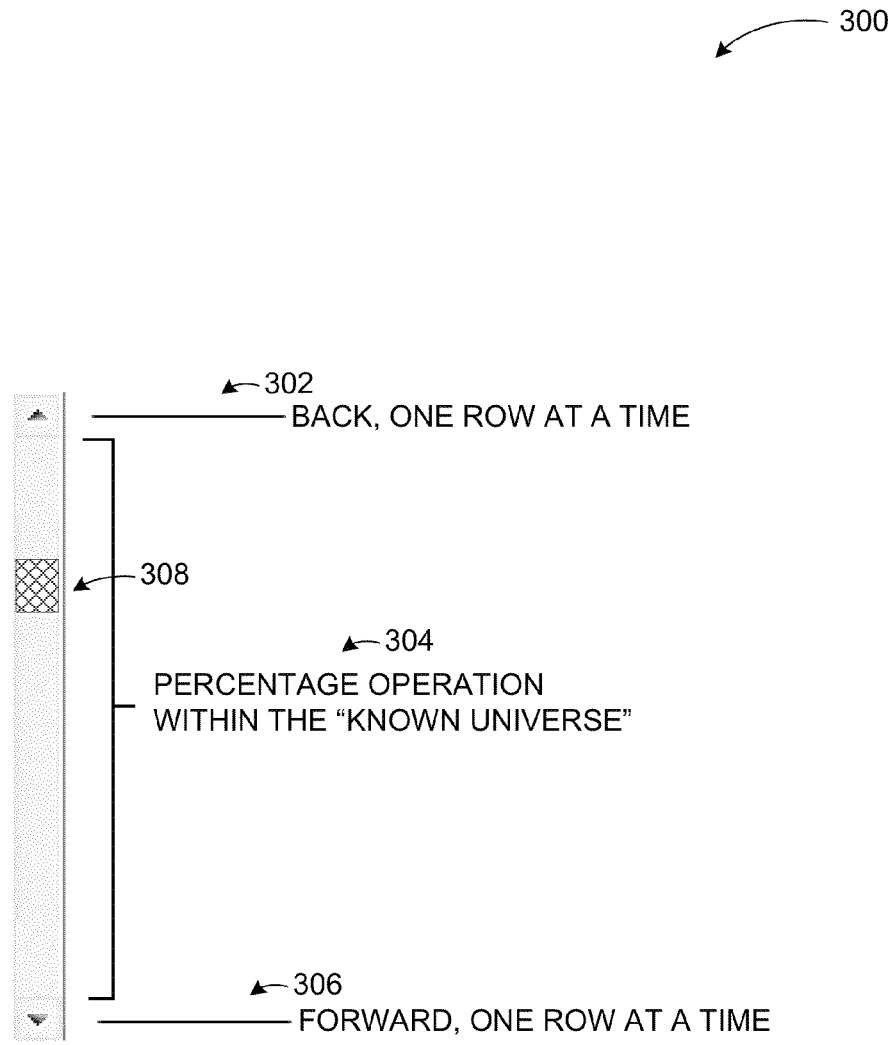
FIG. 3 illustrates an example scrollbar use.

FIG. 3 illustrates an example scrollbar use. Scrollbar 300 reflects a size of available data for display and a relative location of currently displayed data within the available data. The relative location is displayed through the thumb 308. In addition to presenting a relative location of the currently displayed data to the user, thumb 308 may also indicate a ratio of currently displayed data to the entire available data in terms of data size. This may be accomplished by adjusting a size of the thumb 308 (e.g., its height) based on a ratio of the currently displayed data amount to the entire available data amount. Thus, the height of the scrollbar itself 304 represents a "known universe" or in other words, data available for display.

Users may scroll up or down through the available data by clicking on and dragging the thumb 308 up or down on the scrollbar 300. Alternatively, the user may click on the upper and lower arrows 302 or 306 moving back or forward one unit (e.g., row) at a time. Other control elements, for example arrows that enable fast forward or fast backward movement, may also be utilized. The location on the scrollbar at the upper arrow 302 may represent a 0% position (beginning of available data) and the location on the scrollbar at the lower arrow 306 may represent a 100% position (end of available data). These two positions may be used to perform different actions as described herein.

Figure 4:
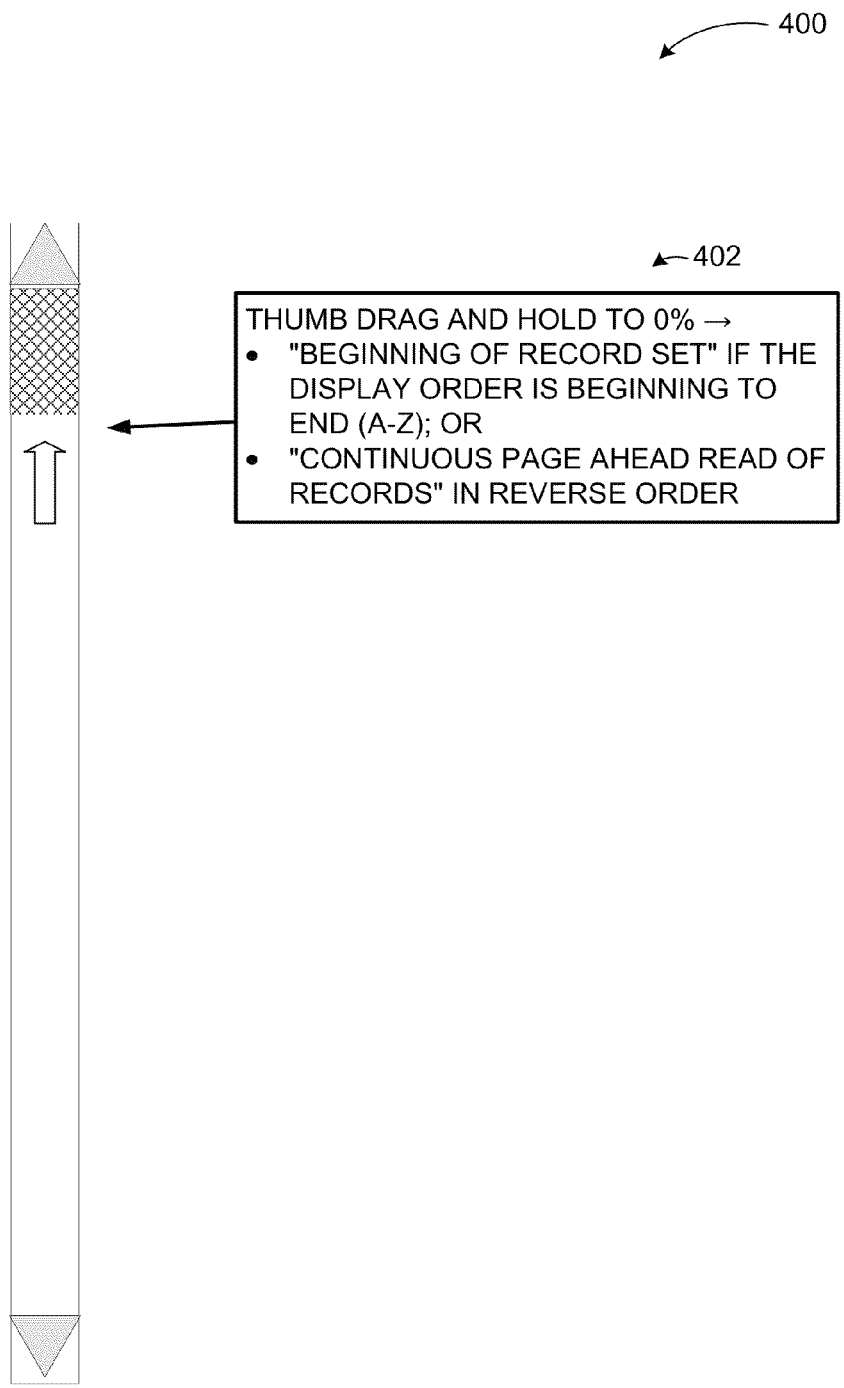
FIG. 4 illustrates one example use of a thumb location according to some embodiments.

FIG. 4 illustrates one example use of a thumb location according to some embodiments. The scroll region for the thumb within a scrollbar as the one shown in diagram 400 provides scroll-to-percent within a known set of records. That is, within the currently materialized set, using a variable, pre-determined page size. The thumb is typically proportionally sized based on the currently known set of records.

In the example implementation of diagram 400, a thumb drag to 0% may result in a "beginning of record set", when the initial page load was oriented from the beginning of the record set (e.g., A-Z) ordering. Otherwise, it may result in a "page ahead read of records" in the reverse ordering (402). Alternatively, a thumb drag and hold to 0% may result in a "beginning of record set" when the initial page load was oriented from the beginning of the record set (e.g., A-Z) ordering. Otherwise, it may result in a "continuous page ahead read of records" in the reverse ordering.

Figure 5:
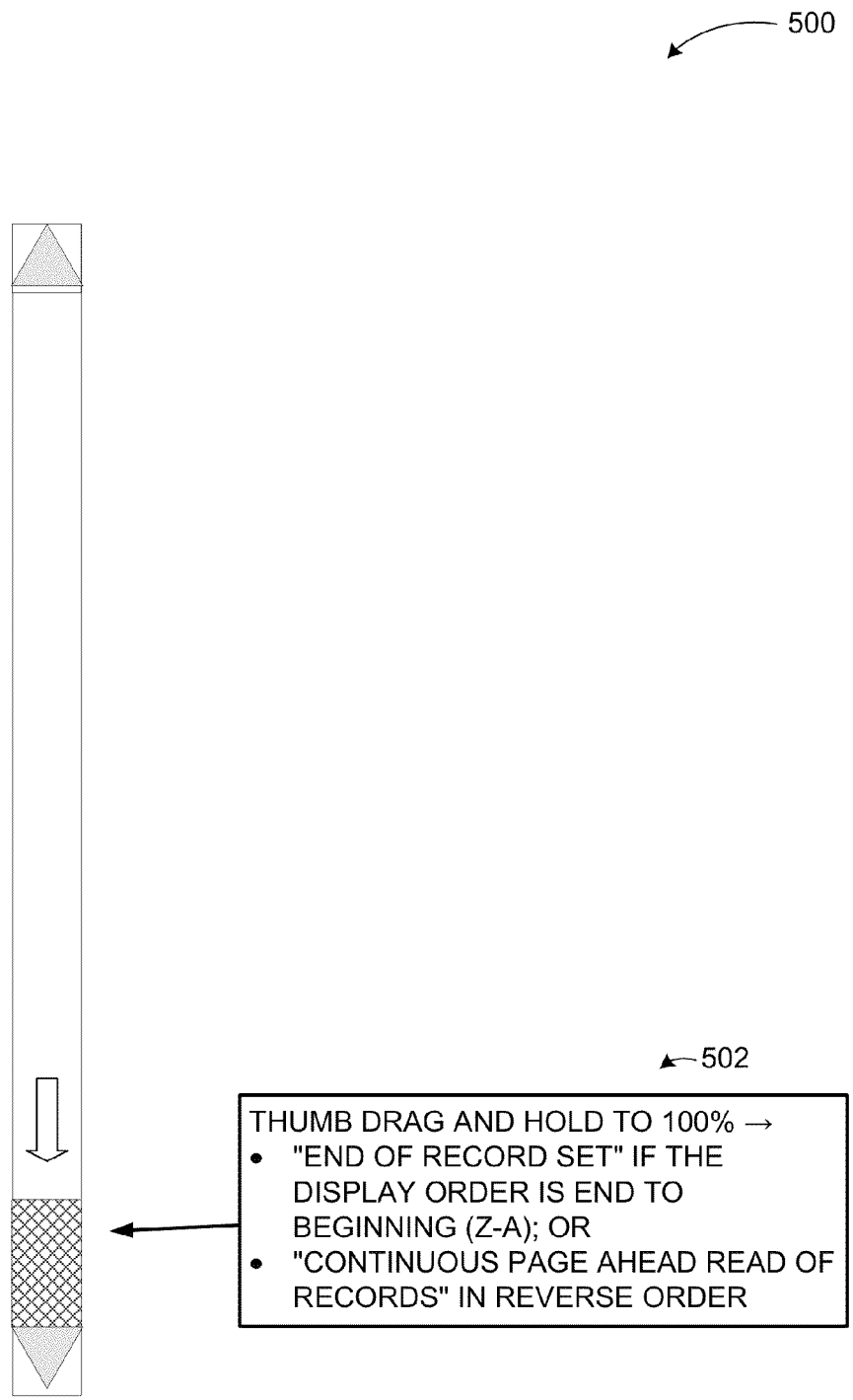
FIG. 5 illustrates another example use of a thumb location according to other embodiments.

FIG. 5 illustrates another example use of a thumb location according to other embodiments. According to the example implementation of diagram 500, a thumb drag to 100% may result in a "end of records set" when the initial page load was oriented from the end of the records set (e.g., Z-A) ordering. Otherwise, the application may provide a "page ahead read of records" in the reverse ordering (502). Alternatively, a thumb drag and hold to 100% may result in a "end of records set" when the initial page load was oriented from the end of the records set (e.g., Z-A) ordering. Otherwise, the client application may provide a "continuous page ahead read of records" in the reverse ordering.

Figure 6:
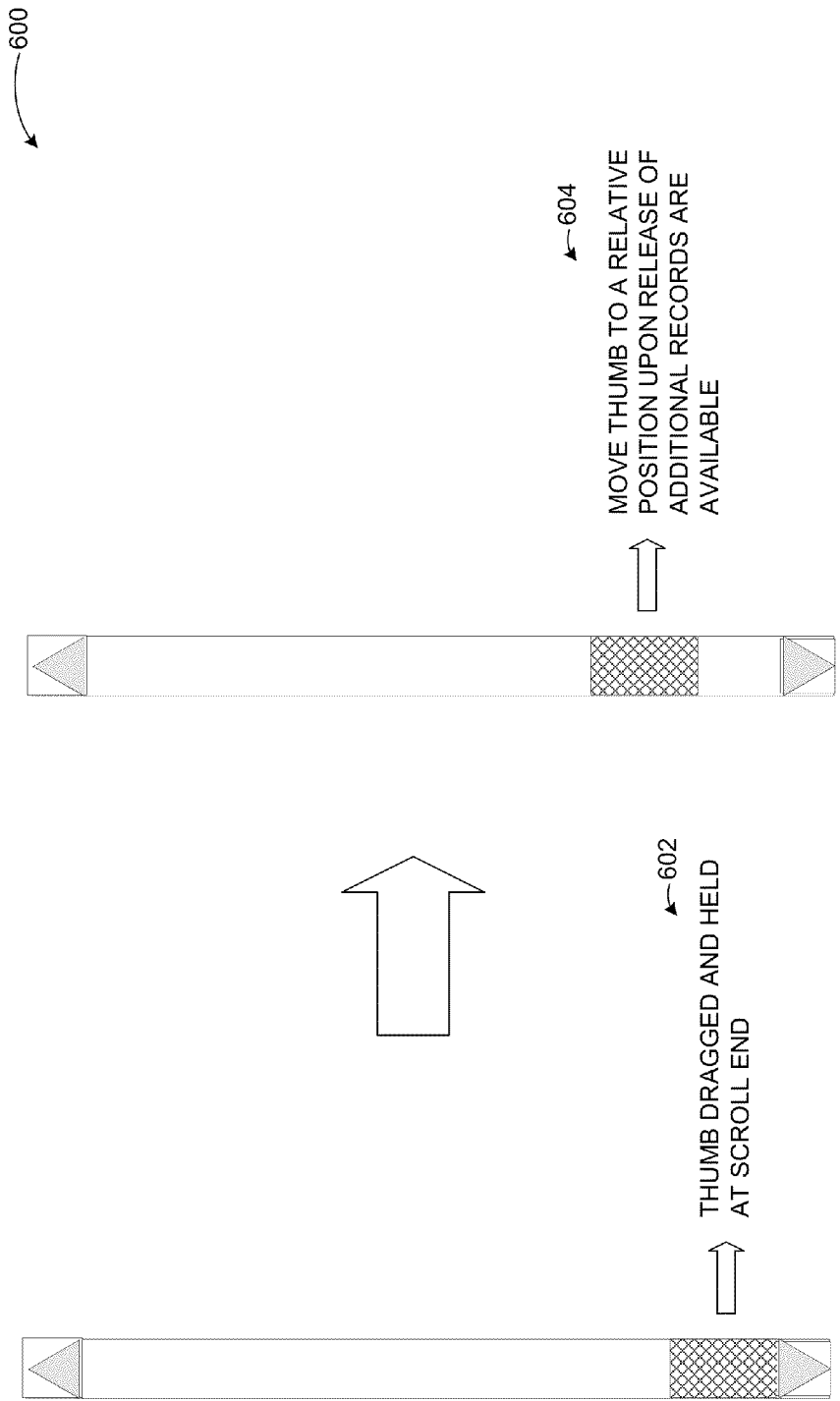
FIG. 6 illustrates a further example use of a thumb location to indicate record availability according to further embodiments.

FIG. 6 illustrates a further example use of a thumb location to indicate record availability according to further embodiments. Diagram 600 shows an additional operation following a drag and hold action by a user.

As shown in diagram 600, the thumb may be dragged and held to one of the two end locations of the scrollbar (602). The records retrieved in response to this action may not represent the entire available records (e.g., search results, database records, etc.). Upon release of the thumb, it may be moved automatically to a predefined location on the scrollbar (depending on the end of scrollbar that was used) indicating availability of additional data (604).

For example, when the thumb is released at the 0% position, and the complete record set has not been returned, the thumb may jump back to the 20% position to indicate "more records." Otherwise, the thumb may rest at the 0% position. Alternatively, when the thumb is released at the 100% position, and the complete record set has not been returned, the thumb may jump back to the 80% marker to indicate "more records." Otherwise, the thumb may rest at the 100% position.

The sensitivity of the drag and drop motion may be adjusted to disregard any inconsequential movements taking the thumb away from the end. If the client application detects an overall pressing of the thumb against the end, it may continue to retrieve pages of records.

The scenarios discussed above are provided as example embodiments. Other scenarios may be used to employ modified scrollbar use for unknown data size using the principles discussed herein.

The systems and implementations of modified scrollbar use for unknown data size discussed above are for illustration purposes and do not constitute a limitation on embodiments. Scroll movement, positioning, and records retrieval requests may be accomplished by an application layer and an application user interface. Data storage and presentation may be done by a data store. Efficient data retrieval using a thumb position may be implemented employing other modules, processes, and configurations using the principles discussed herein.

Figure 7:
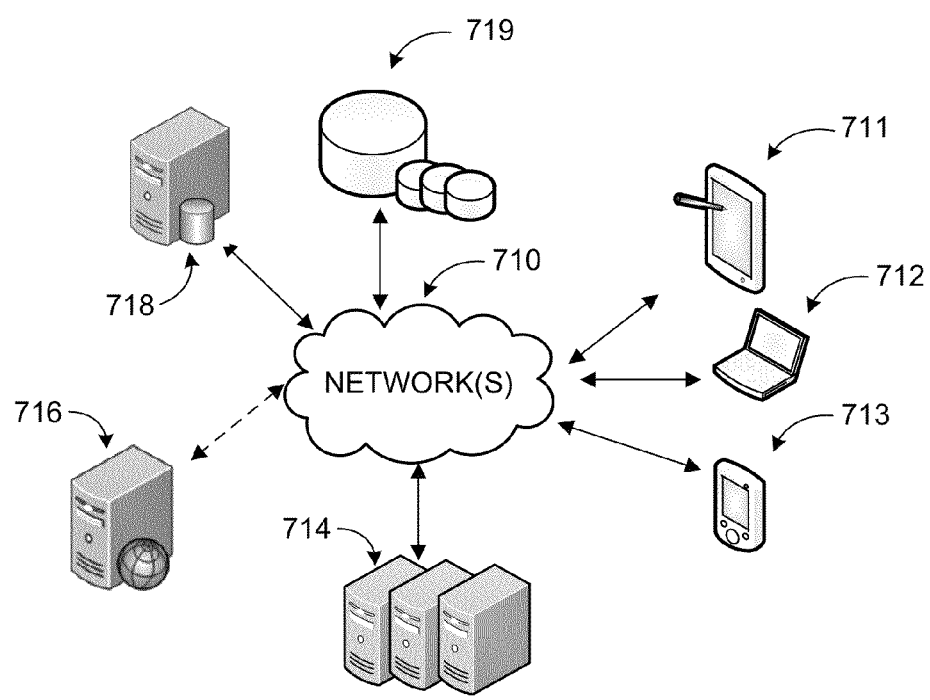
FIG. 7 is a networked environment, where a system according to embodiments may be implemented.

FIG. 7 is an example networked environment, where embodiments may be implemented. Data services may be provided via software executed over one or more servers 714 or a single server (e.g. web server) 716 such as a hosted service. The platform may communicate with client applications on individual computing devices such as a smart phone 713, a laptop computer 712, or tablet computer 711 ('client devices') through network(s) 710.

As discussed above, a client application may enable a user to retrieve pages of records on demand. Pages of records may be retrieved with a thumb movement within a scrollbar on the client devices 711-713. After the retrieval of the initial set of records, a position of the thumb and a user action (e.g., drag and hold to one end of the scrollbar) may be used to retrieve additional records in a fast forward or fast backward manner.

Client devices 711-713 may enable access to applications executed on remote server(s) (e.g. one of servers 714) as discussed previously. The server(s) may retrieve or store relevant data from/to data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed for modified scrollbar use for unknown data size. Furthermore, the networked environments discussed in FIG. 7 are for illustration purposes only. Embodiments are not limited to the example applications, modules, or processes.

Figure 8:
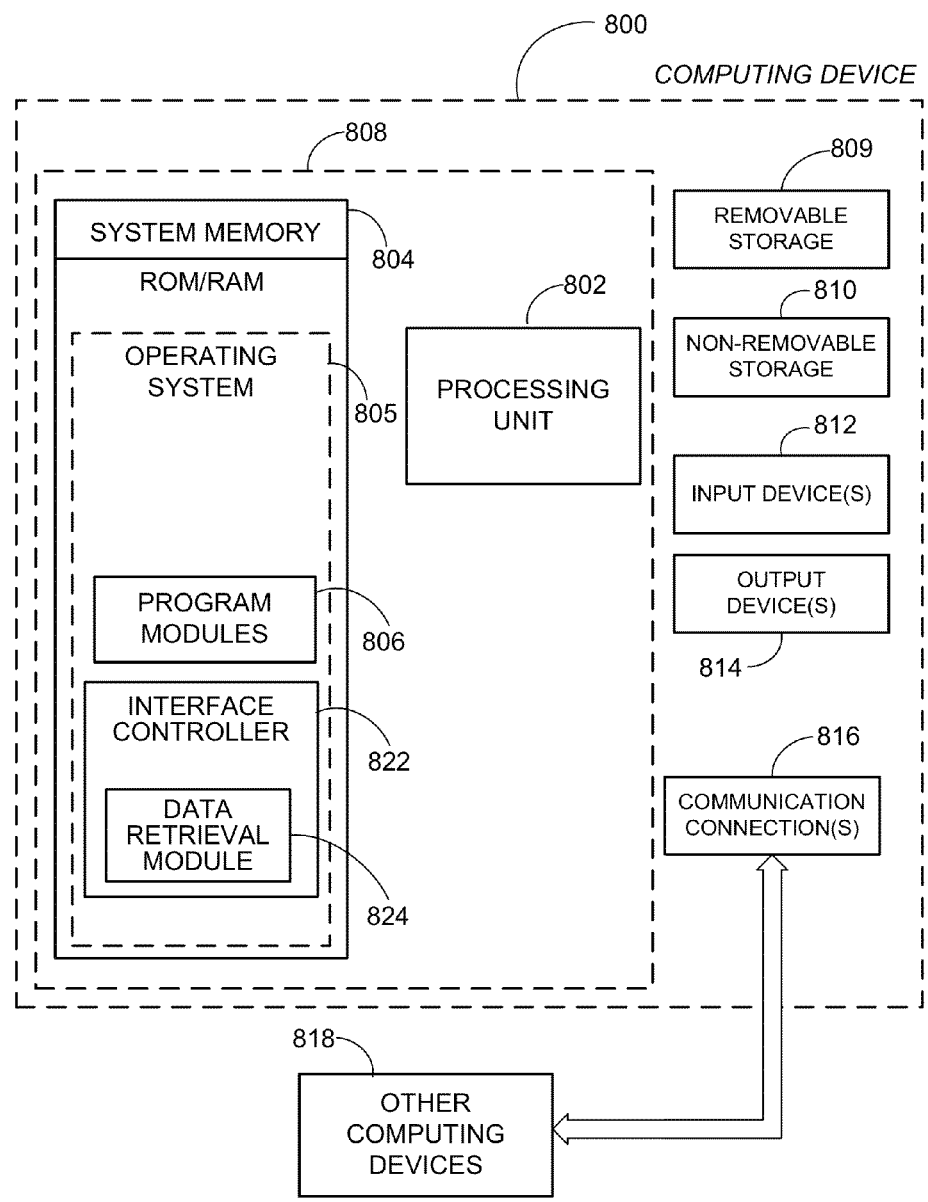
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, interface controller 822, and data retrieval module 824.

Data retrieval module 824 may be part of a service such as a search application and retrieve records from one or more data stores for display on a user interface managed by interface controller 822. Interface controller 822 may employ thumb location and user action to retrieve additional records and indicate to a user a position of displayed records to available records as described above. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, storage servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 9:
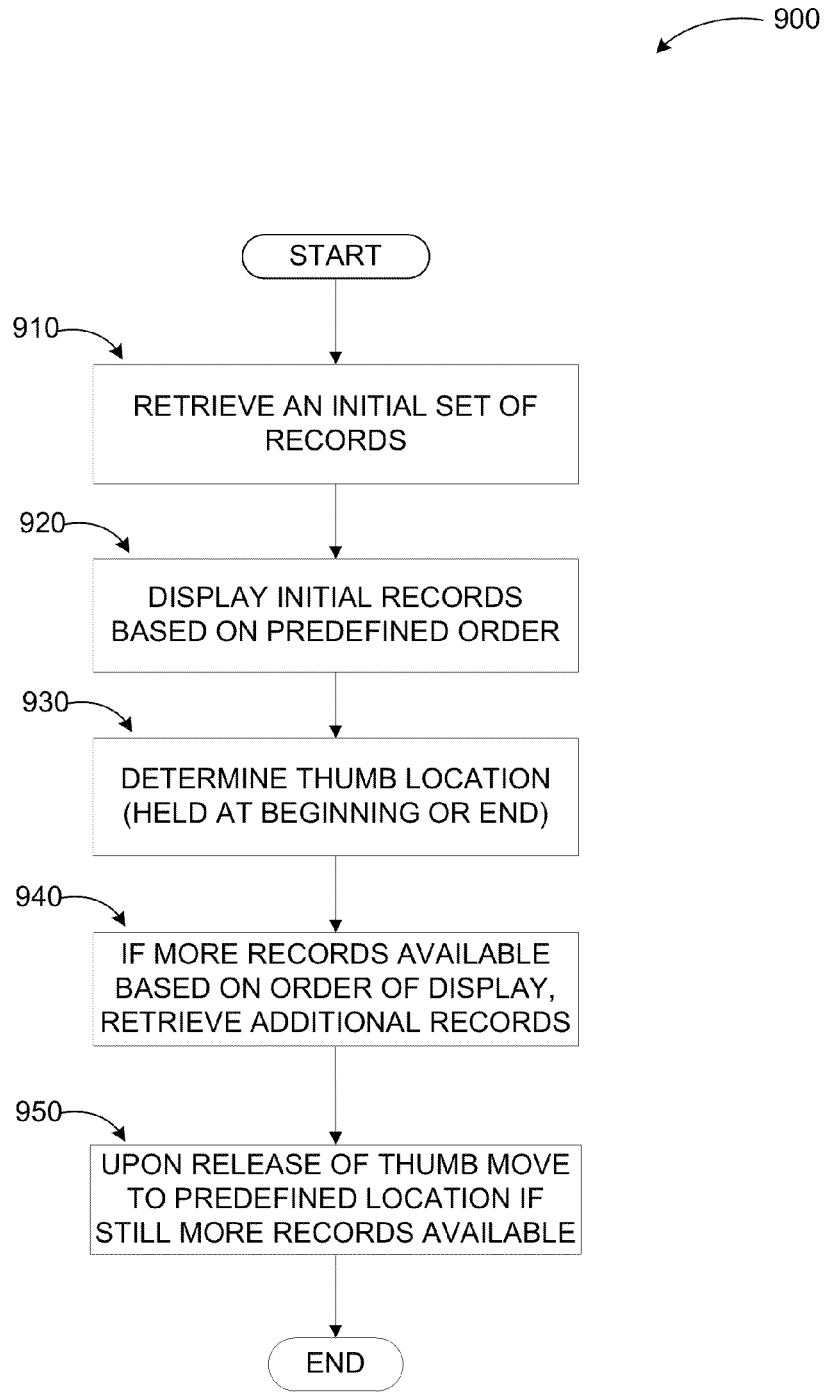
FIG. 9 illustrates a logic flow diagram for a process employing modified scrollbar use for unknown data size according to embodiments.

FIG. 9 illustrates a logic flow diagram for a process employing rapid data retrieval using a thumb scroll according to embodiments. Process 900 may be implemented by a client application, or similar application on any computing device.

Process 900 may begin by retrieving an initial set of records at operation 910 followed by display of the initial records based on a predefined order (e.g., A-Z, 1-9, etc.) at operation 920. At operation 930, the application displaying the records may determine a location of the thumb and/or a user action. For example, the thumb being dragged to the 0% position or 100% position on the scrollbar may result in two different actions. Furthermore, the thumb being dragged to one of those locations and held there may result in yet two other actions regarding data retrieval.

At operation 940, additional records may be retrieved, if any are available, based on the predefined order of the displayed records depending on the location of the thumb, as described above. At operation 950, the thumb may be moved to a predefined location upon release by the user (if the user action was drag and hold) to indicate that there are still more records available for retrieval. According to some embodiments, an appearance of the thumb may be modified (e.g., color, shading, size, content, etc.) when it is held at one end of the scrollbar.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 900 are for illustration purposes. Modified scrollbar use for unknown data size according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for managing data retrieval through scrollbar actions, the method comprising:
   retrieving an initial set of records from a data store;
   determining a user action and a location of a user interface control component, "thumb", on a scrollbar associated with a user interface displaying a portion of the initial set of records;
   if the user action is a drag-and-hold and the thumb location is a 0% position of the scrollbar, one of: retrieving another set of records indicating a beginning of the records depending on a predefined display order of the initial set of records; and
   upon detecting a release of the thumb, automatically moving the thumb to a predefined location on the scrollbar to indicate availability of additional records at the data store if entire available records have not yet been retrieved, wherein the predefined location is dependent on a position on the scrollbar from which the thumb was released such that the predefined location is 20% marker on the scrollbar if the thumb is released from the 0% position and 80% marker if the thumb is released from a 100% position.

2. The method of claim 1, further comprising:
   if the user action is a drag-and-hold and the thumb location is the 100% position of the scrollbar, one of: retrieving a further set of records and indicating an end of the records depending on the predefined display order of the initial set of records.

3. The method of claim 2, wherein the 0% position of the scrollbar corresponds to a beginning of the initial set of records and the 100% position of the scrollbar corresponds to an end of the initial set of records if the initial set of records is displayed in an ascending order.

4. The method of claim 2, wherein the 0% position of the scrollbar corresponds to an end of the initial set of records and the 100% position of the scrollbar corresponds to a beginning of the initial set of records if the initial set of records is displayed in a descending order.

5. The method of claim 1, wherein the predefined display order of the initial set of records is based on one of: a numeric ordering, an alphabetic ordering, and an alphanumeric ordering.

6. The method of claim 5, wherein retrieving the other set of records includes continuous scrolling over multiple records.

7. The method of claim 1, wherein the scrollbar is positioned along one edge of a control within the user interface, and the thumb is dragged in one of a top-to-bottom and bottom-to-top motion.

8. The method of claim 1, further comprising:
   modifying an appearance of the thumb when it is held at one end of the scrollbar.

9. The method of claim 1, further comprising:
   automatically adjusting a size of the thumb in response to retrieving the other set of records, wherein a size of the thumb represents a ratio of displayed records to retrieved records.

10. A computing device capable of managing data retrieval through scrollbar actions, the computing device comprising:
    a memory;
    a processor coupled to the memory, the processor executing an application in conjunction with instructions stored in the memory, wherein the application is configured to:
    retrieve an initial set of records from a data store;
    determine a user action and a location of a user interface control component, "thumb", on a scrollbar associated with a user interface displaying a portion of the initial set of records;
    if the user action is a drag-and-hold and the thumb location is a 0% position of the scrollbar, one of: retrieve another set of records and indicate a beginning of the records depending on a predefined display order of the initial set of records;

if the user action is the drag-and-hold and the thumb location is a 100% position of the scrollbar, one of: retrieve a further set of records and indicate an end of the records depending on the predefined display order of the initial set of records; and varying a retrieval speed of records based on a closeness of the thumb to an absolute position on the scrollbar, wherein the thumb brought to the 0% position of the scrollbar acts as a fast forward control and the thumb brought to the 100% position on the scrollbar acts as a fast reverse control instead of seeking to the absolute position when a total number of the records is not known.

11. The computing device of claim 10, wherein the application is further configured to move the thumb to a predefined location upon detecting a release of the thumb to indicate availability of additional records at the data store if entire available records have not yet been retrieved.

12. The computing device of claim 11, wherein the predefined location is about 20% marker on the scrollbar if the thumb is released from the 0% position and about 80% marker if the thumb is released from the 100% position.

13. The computing device of claim 11, wherein the application is further configured to rest the thumb at one of the 0% and 100% positions if entire available records at the respective position have been retrieved.

14. The computing device of claim 10, wherein the application is further configured to display the initial set of records, the other set of records, and the further set of records according to the predefined display order.

15. The computing device of claim 14, wherein the records are displayed employing a variable and predetermined page size.

16. The computing device of claim 10, wherein the records include one of search results and database records.

17. A computing device capable of managing data retrieval through scrollbar actions, the computing device comprising:
a memory;
a processor coupled to the memory, the processor executing an application in conjunction with instructions stored in the memory, wherein the application is configured to:
retrieve an initial set of records from a data store;
determine a user action and a location of a user interface control component, "thumb", on a scrollbar associated with a user interface displaying a portion of the initial set of records;
if the user action is a drag-and-hold and the thumb location is a 0% position of the scrollbar, one of: retrieve another set of records and indicate a beginning of the records depending on a predefined display order of the initial set of records;
if the user action is the drag-and-hold and the thumb location is a 100% position of the scrollbar, one of: retrieve a further set of records and indicate an end of the records depending on the predefined display order of the initial set of records;
move the thumb to a predefined location upon detecting a release of the thumb to indicate availability of additional records at the data store if entire available records have not yet been retrieved at the respective position from which the thumb was released, wherein the predefined location is dependent on a position on the scrollbar from which the thumb was released such that the predefined location is 20% marker on the scrollbar if the thumb is released from the 0% position and 80% marker if the thumb is released from the 100% position; and
vary a retrieval speed of records based on a closeness of the thumb to an absolute position on the scrollbar, wherein the thumb brought to the 0% position of the scrollbar acts as a fast forward control and the thumb brought to the 100% position on the scrollbar acts as a fast reverse control instead of seeking to the absolute position when a total number of the records is not known.

18. The computing device of claim 17, wherein the application is further configured to retrieve the other set of records by continuous scrolling over multiple records in a descending order if the 0% position corresponds to an end of available records in a descending order.

19. The computing device of claim 17, wherein the application is further configured to retrieve the further set of records by continuous scrolling over multiple records in an ascending order if the 100% position corresponds to an end of available records in an ascending order.

\* \* \* \* \*